US012676027B2

(12) United States Patent
Gao et al.

(10) Patent No.: US 12,676,027 B2
(45) Date of Patent: Jul. 7, 2026

(54) IMAGE LIVENESS DETECTION METHOD AND DEVICE

(71) Applicant: MaShang Consumer Finance Co., Ltd., Chongqing (CN)

(72) Inventors: Liang Gao, Chongqing (CN); Xunyi Zhou, Chongqing (CN); Dingheng Zeng, Chongqing (CN)

(73) Assignee: MaShang Consumer Finance Co., Ltd., Chongqing (CN)

( * ) Notice: Subject to any disclaimer, the term of this patent is extended or adjusted under 35 U.S.C. 154(b) by 217 days.

(21) Appl. No.: 18/624,724

(22) Filed: Apr. 2, 2024

(65) Prior Publication Data

US 2024/0249559 A1 Jul. 25, 2024

Related U.S. Application Data

(63) Continuation of application No. PCT/CN2023/074146, filed on Feb. 1, 2023.

(30) Foreign Application Priority Data

Jun. 13, 2022 (CN) .......................... 202210660276.7

(51) Int. Cl.
*G06K 9/00* (2022.01)
*G06T 7/12* (2017.01)
(Continued)

(52) U.S. Cl.
CPC ............... *G06V 40/40* (2022.01); *G06T 7/12* (2017.01); *G06V 10/44* (2022.01); *G06V 10/806* (2022.01); *G06V 20/70* (2022.01)

(58) Field of Classification Search
CPC ...... G06N 3/0455; G06N 3/0464; G06N 3/08; G06T 7/12; G06V 10/26; G06V 10/44;
(Continued)

(56) References Cited

U.S. PATENT DOCUMENTS 11,670,069 B2 * 6/2023 Timoshenko .......... G06V 40/40
382/115
2006/0280344 A1 12/2006 Kee et al.
(Continued)

FOREIGN PATENT DOCUMENTS

CN 107463875 A 12/2017
CN 107609494 A 1/2018
(Continued)

OTHER PUBLICATIONS

European Patent Office, "Search Report" in Application No. 23822630. 2-1207, Feb. 4, 2025, 8 pages.
(Continued)

*Primary Examiner* — Hadi Akhavannik
(74) *Attorney, Agent, or Firm* — Cooper Legal Group, LLC

(57) ABSTRACT

Embodiments of the disclosure provide an image liveness detection method and device. The method includes: performing semantic segmentation processing on a to-be-detected image to obtain a first masked image corresponding to a medium image block in the to-be-detected image; performing a biometric recognition on the to-be-detected image to obtain boundary information of a biometric image block in the to-be-detected image; performing pixel processing on the to-be-detected image based on the boundary information to obtain a second masked image corresponding to the biometric image block; obtaining, through calculation, a degree of overlap between the medium image block and the biometric image block based on the first masked image and the second masked image; determining a liveness detection result of the to-be-detected image according to the degree of overlap.

17 Claims, 6 Drawing Sheets

(51) Int. Cl.

| | |
|---|---|
| *G06V 10/44* | (2022.01) |
| *G06V 10/80* | (2022.01) |
| *G06V 20/70* | (2022.01) |
| *G06V 40/40* | (2022.01) |

(58) Field of Classification Search

CPC ...... G06V 10/806; G06V 10/82; G06V 20/70; G06V 40/162; G06V 40/40; G06V 40/45

See application file for complete search history.

(56) References Cited

U.S. PATENT DOCUMENTS

| | | | | |
|---|---|---|---|---|
| 2019/0026544 | A1* | 1/2019 | Hua ..................... | A61B 5/1128 |
| 2021/0117709 | A1* | 4/2021 | Halet ................... | G06V 40/161 |
| 2021/0248401 | A1* | 8/2021 | Timoshenko .......... | G06V 40/40 |

FOREIGN PATENT DOCUMENTS

| | | | |
|---|---|---|---|
| CN | 109325463 | A | 2/2019 |
| CN | 110929635 | A | 3/2020 |
| CN | 111488764 | A | 8/2020 |
| CN | 112307848 | A | 2/2021 |

OTHER PUBLICATIONS

Zhu et al., "Detection of Spoofing Medium Contours for Face Anti-Spoofng", IEEE Transactions on Circits and Systems for Video Technology, vol. 31, No. 5, May 2021, 7 pages.

International Search Report issued in related International Application No. PCT/CN2023/074146, mailed on Apr. 21, 2023, in 13 pages.

First Office Action of the Chinese application No. 202210660276.7, issued on Dec. 25, 2025, 20 pages.

Second Office Action of the Chinese application No. 202210660276. 7, issued on Apr. 30, 2026. 15 pages.

* cited by examiner

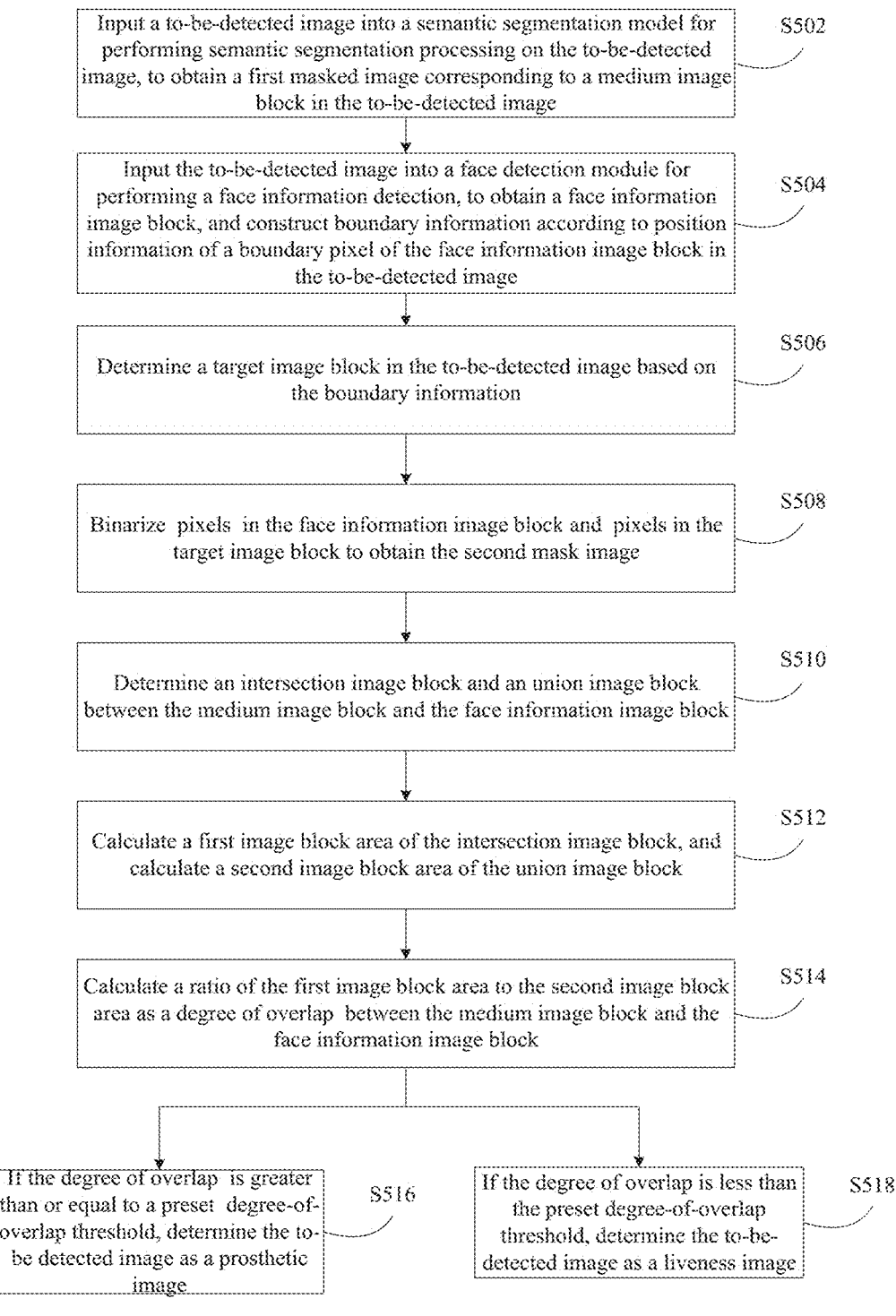

Input a to-be-detected image into a semantic segmentation model for performing semantic segmentation processing on the to-be-detected image, to obtain a first masked image corresponding to a medium image block in the to-be-detected image — S502

Input the to-be-detected image into a face detection module for performing a face information detection, to obtain a face information image block, and construct boundary information according to position information of a boundary pixel of the face information image block in the to-be-detected image — S504

Determine a target image block in the to-be-detected image based on the boundary information — S506

Binarize pixels in the face information image block and pixels in the target image block to obtain the second mask image — S508

Determine an intersection image block and an union image block between the medium image block and the face information image block — S510

Calculate a first image block area of the intersection image block, and calculate a second image block area of the union image block — S512

Calculate a ratio of the first image block area to the second image block area as a degree of overlap between the medium image block and the face information image block — S514

If the degree of overlap is greater than or equal to a preset degree-of-overlap threshold, determine the to-be detected image as a prosthetic image — S516

If the degree of overlap is less than the preset degree-of-overlap threshold, determine the to-be-detected image as a liveness image — S518

FIG. 5

IMAGE LIVENESS DETECTION METHOD AND DEVICE

CROSS-REFERENCE TO RELATED APPLICATIONS

This application is a continuation of International Application No. PCT/CN2023/074146, filed on Feb. 1, 2023, which claims priority to Chinese Patent Application No. 202210660276.7, filed on Jun. 13, 2022, and entitled "IMAGE LIVENESS DETECTION METHOD AND DEVICE." The disclosures of the aforementioned applications are hereby incorporated by reference in their entireties.

TECHNICAL FIELD

The present disclosure relates to the field of liveness detection technology and, in particular, to an image liveness detection method and device.

BACKGROUND

Biometric identification technology has made great development and progress in recent years, such as identity confirmation through face recognition and iris recognition, etc. However, biometric identification systems are confronted with the risk of being vulnerable to biometric masquerade of users, for example, the masquerade is performed for biometric recognition by using spoofing attack media such as photos, videos, masks and head models.

In the biometric identification technology, it is necessary to perform image liveness detection. With the image liveness detection, a judgment can be made to a biometric image that is to be acquired, and a determination can be made to whether a biometric feature is a real user's biometric feature or a user's masqueraded biometric feature, for example, a face captured with a mobile phone, a paper printed face, or a 3D silicone face mask, etc.

SUMMARY

In a first aspect, an embodiment of the present disclosure provides an image liveness detection method, including: performing semantic segmentation processing on a to-be-detected image to obtain a first masked image corresponding to a medium image block in the to-be-detected image; performing a biometric recognition on the to-be-detected image to obtain boundary information of a biometric image block in the to-be-detected image; processing pixels of the to-be-detected image based on the boundary information to obtain a second masked image corresponding to the biometric image block; obtaining, through calculation, a degree of overlap between the medium image block and the biometric image block based on the first masked image and the second masked image; and determining a liveness detection result of the to-be-detected image according to the degree of overlap.

It can be seen that, in the embodiment of the present disclosure, firstly, the to-be-detected image is used as a segmentation target, and the first masked image corresponding to the medium image block is obtained by performing the semantic segmentation processing on the to-be-detected image. A spoofing medium in the to-be-detected image is detected by means of the semantic segmentation processing so that a preliminary image liveness detection is achieved. Secondly, the boundary information of the biometric image block is obtained by identifying the biometric feature(s) in the to-be-detected image. And the second masked image is obtained by performing corresponding pixel processing on the to-be-detected image based on the boundary information. Then, the degree of overlap between the medium image block in the first masked image and the biometric image block in the second masked image is calculated based on the first masked image and the second masked image, in this way, a determination is made to whether the biometric feature is in the medium image block, thereby improving the accuracy of detection on whether the biometric feature is in the medium image block. And the liveness detection result of the to-be-detected image is determined based on the calculated degree of overlap, in this way, the biometric feature contained in the medium image block is detected in the to-be-detected image, thereby preventing the biometric feature in the medium image block from being detected as a liveness feature, and in turn avoiding further impacts on the liveness detection result of the to-be-detected image. The effectiveness of the image liveness detection is improved. Meanwhile, this further improves the detection accuracy of the image liveness detection on the basis of improving the accuracy of detection on whether the biometric feature is in the medium image block.

In a second aspect, an embodiment of the present disclosure provides an image liveness detection device, including: a semantic segmentation processing module configured to perform semantic segmentation processing on a to-be-detected image to obtain a first masked image corresponding to a medium image block in the to-be-detected image; a biometric recognition module configured to perform a biometric recognition on the to-be-detected image to obtain boundary information of a biometric image block in the to-be-detected image; a pixel processing module configured to process pixels of the to-be-detected image based on the boundary information to obtain a second masked image corresponding to the biometric image block; a degree-of-overlap calculation module configured to obtain, through calculation, a degree of overlap between the medium image block and the biometric image block based on the first masked image and the second masked image; and a detection result determination module configured to determine a liveness detection result of the to-be-detected image according to the degree of overlap.

In a third aspect, an embodiment of the present disclosure provides an image liveness detection apparatus, including: a processor and a memory which is configured to store computer-executable instructions, where when the computer-executable instructions are executed, the processor is caused to implement the image liveness detection method according to the first aspect.

In a fourth aspect, an embodiment of the present disclosure provides a computer-readable storage medium configured to store computer-executable instructions, where when the computer-executable instructions are executed by a processor, the image liveness detection method according to the first aspect is implemented.

In a fifth aspect, an embodiment of the present disclosure provides a computer program product including a non-transient computer-readable storage medium, where a computer program is stored in the non-transient computer-readable storage medium, and is operable to enable a computer to implement the image liveness detection method according to the first aspect.

BRIEF DESCRIPTION OF DRAWINGS

In order to more clearly illustrate the technical solutions in the embodiments of the present disclosure or the prior art, a brief introduction will be made hereunder to the drawings to be used in the description of the embodiments or the prior art. Obviously, the accompanying drawings in the following description are only intended for some embodiments recorded in the present disclosure. For those ordinarily skilled in the art, other drawings can also be obtained based on these drawings without any creative effort.

Figure 1:
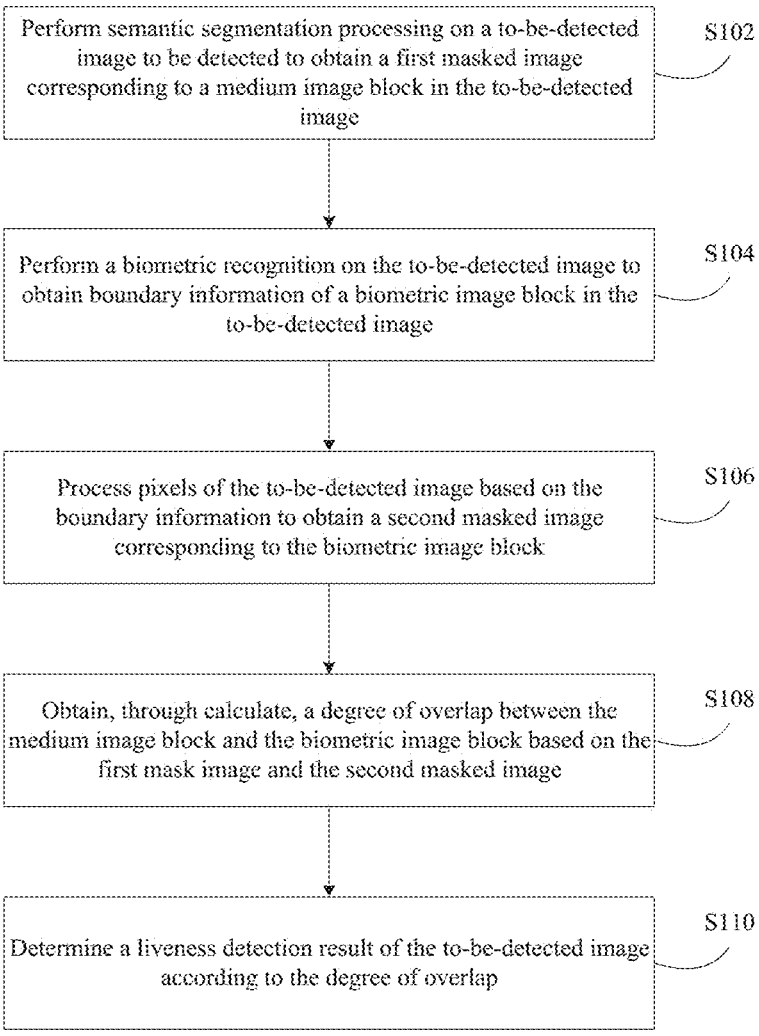

FIG. 1 is a processing flowchart of an image liveness detection method provided in an embodiment of the present disclosure.

Figure 2:
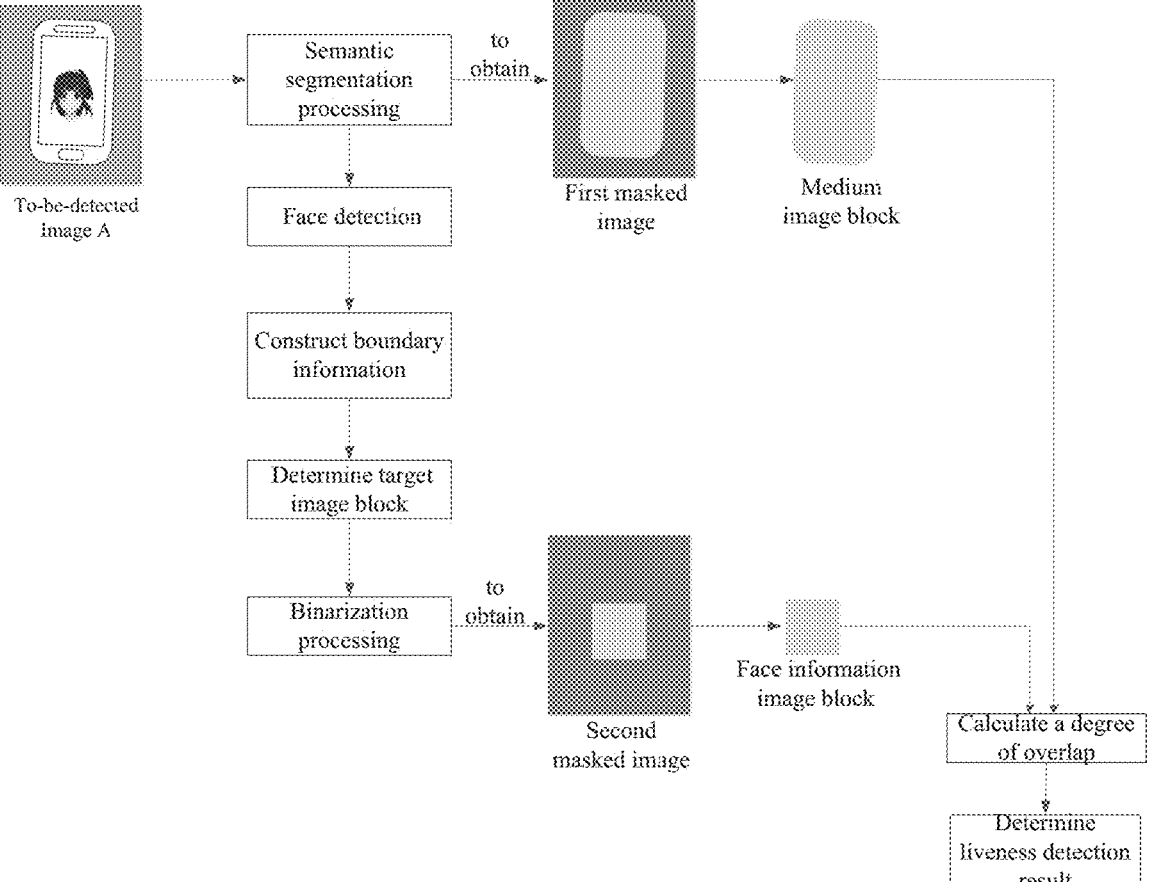

FIG. 2 is a schematic diagram of an image liveness detection process provided in an embodiment of the present disclosure.

Figure 3:
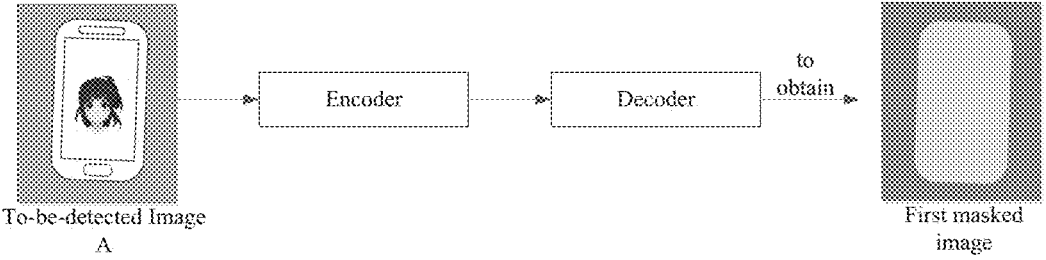

FIG. 3 is a schematic diagram of a semantic segmentation process provided in an embodiment of the present disclosure.

Figure 4:
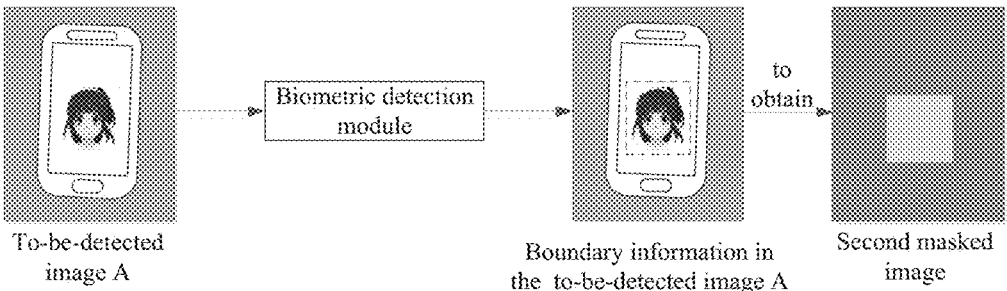

FIG. 4 is a schematic diagram of a biometric recognition process provided in an embodiment of the present disclosure.

FIG. 5 is a processing flowchart of an image liveness detection method applied to a face detection scenario provided in an embodiment of the present disclosure.

Figure 6:
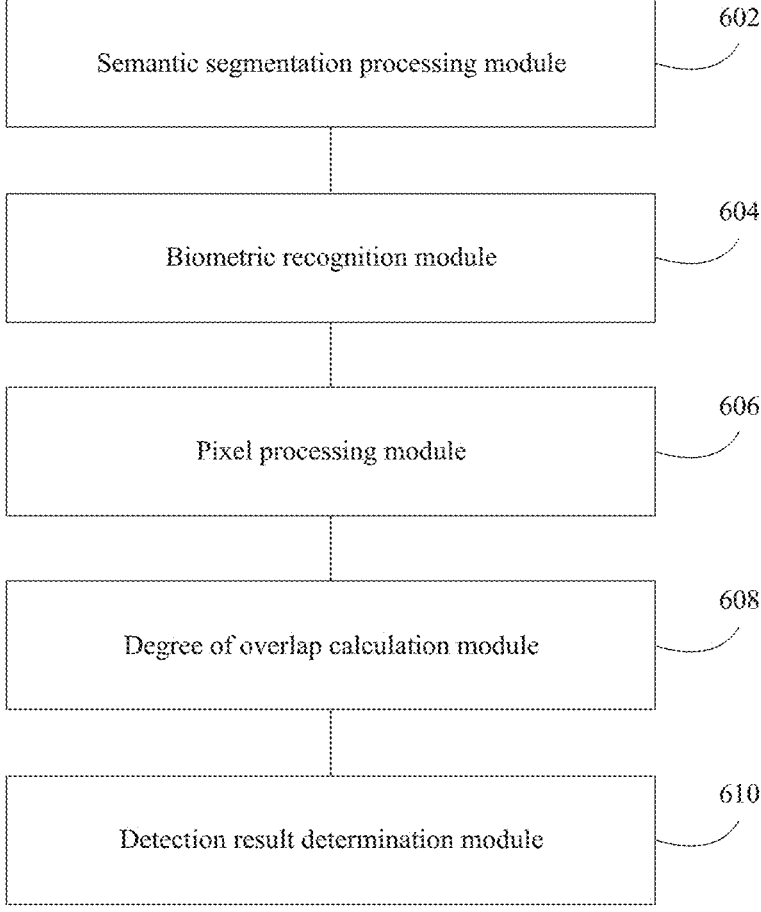

FIG. 6 is a schematic diagram of an image liveness detection device provided in an embodiment of the present disclosure.

Figure 7:
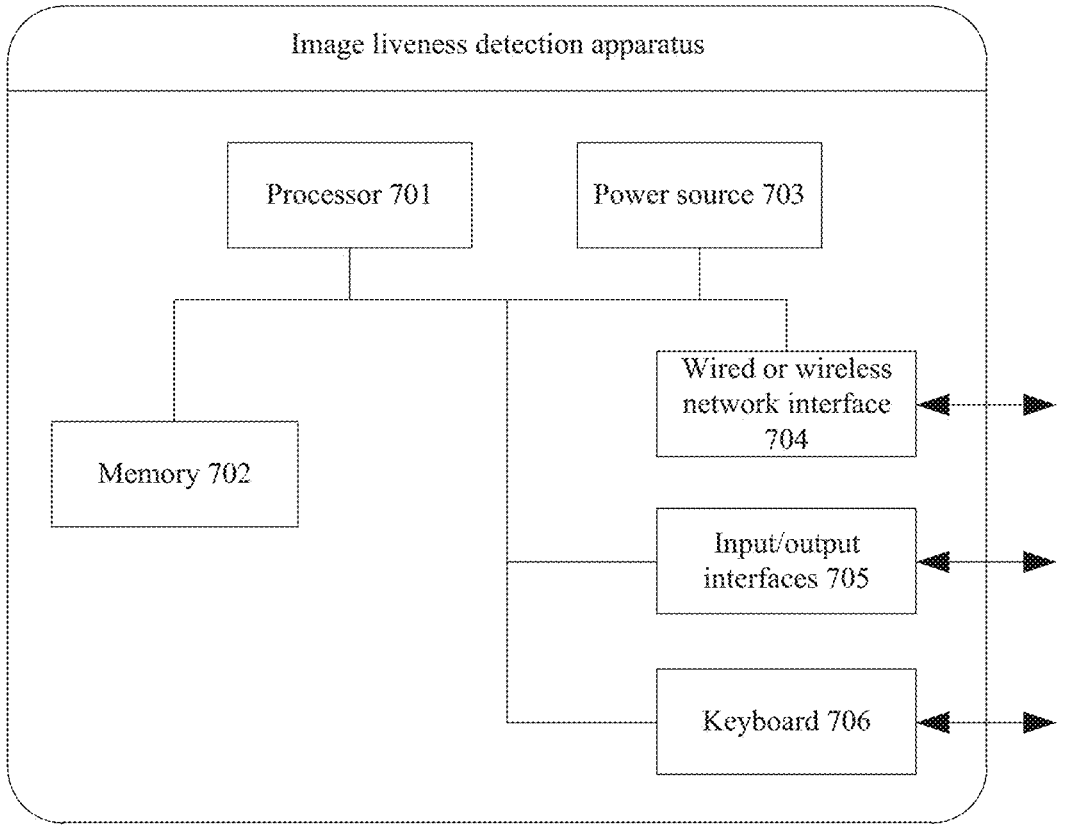

FIG. 7 is a schematic structural diagram of an image liveness detection apparatus provided in an embodiment of the present disclosure.

DETAILED DESCRIPTION OF EMBODIMENTS

In order to enable persons skilled in the art to better understand the technical solutions in the embodiments of the present disclosure, the technical solutions in the embodiments of the present disclosure will be described hereunder clearly and comprehensively in conjunction with the drawings in the embodiments of the present disclosure. Obviously, the described embodiments are only some of the embodiments of the present disclosure, rather than all of them. All other embodiments obtained by persons of ordinary skill in the art based on the embodiments of the present disclosure without creative efforts shall fall within the protection scope of the present disclosure.

In practical applications, in the process of performing a liveness detection, it is often necessary to rely on a model such as a deep learning model and a model based on RPPG (Remote Photoplethysmography) signal supervision. However, these models have good defense performance against known attack types, while they cannot accurately predict unknown attack types, such as electronic screens made of various materials, various paper photos, masks made of various materials, and belong to an open set, with a wide distribution of data and impossibility to be exhaustive, thereby bringing great difficulty to model learning and resulting in low accuracy of an image liveness detection.

In view of this, in order to improve the accuracy of the image liveness detection, on the one hand, a first masked image corresponding to a medium image block is obtained by performing semantic segmentation processing on a to-be-detected image to identify a spoofing medium in the to-be-detected image, and a preliminary image liveness detection is achieved. The basis of semantic segmentation can be explained by an output semantic segmentation result and thus is interpretable. On the other hand, a second masked image is obtained by identifying a biometric feature in the to-be-detected image, and performing pixel filling on the to-be-detected image based on boundary information of the identified biometric feature. With the help of the first masked image and the second masked image, a degree of overlap between the medium image block of the spoofing medium in the first masked image and a biometric image block in the second masked image is calculated, in this way a determination is made to whether the biometric feature is in the medium image block, thereby improving the accuracy of detection on whether the biometric feature is in the medium image block. And the image liveness detection result is determined based on the degree of overlap. In this way, on the basis of the preliminary image liveness detection, a judgement is made to the image liveness detection result according to the degree of overlap between the medium image block and the biometric image block, and a secondary image liveness detection is achieved. The biometric feature contained in the medium image block is detected in the to-be-detected image, thereby preventing the biometric feature in the medium image block from being detected as a liveness feature, and in turn avoiding impacts on the liveness detection result of the to-be-detected image. The effectiveness of the image liveness detection is improved.

With reference to FIG. 1, the image liveness detection method provided in present embodiment specifically includes steps S102 to S110.

Step S102, perform semantic segmentation processing on a to-be-detected image to obtain a first masked image corresponding to a medium image block in the to-be-detected image.

The medium image block described in this embodiment refers to a spoofing medium area or a spoofing medium range of a spoofing medium in the to-be-detected image, such as a screen range or a screen area of an electronic screen in a to-be-detected image A as shown in FIG. 3. The first masked image includes the medium image block and remaining image blocks except for the medium image block in the to-be-detected image, where pixels in the medium image block are inconsistent with pixels in the remaining image blocks.

The spoofing medium refers to a medium of a biometric facsimile spoofing a real person's identity, including but not limited to: electronic screens, paper photos, masks, head models. For example, the spoofing medium is a paper photo containing face information, and for another example, the spoofing medium is an electronic screen containing eye information.

The first masked image shown in FIG. 3 is a binary masked image. The binary masked image refers to that each pixel on an image has only two possible values. The pixels in the medium image block have a pixel value of 255, i.e. a light colored area. The pixels in the remaining image blocks are set to have a pixel value of 0, i.e. a dark colored area. The light colored area and the dark colored area here are only exemplary. In a case where the pixels in the medium image block have a pixel value of 255, the medium image block is white. In a case where the pixels in the remaining image blocks are set to have a pixel value of 0, the remaining image blocks are black.

In a specific implementation, in order to accurately identify the spoofing medium in the to-be-detected image, achieve a preliminary liveness detection of the to-be-detected image, and lay a foundation for later determining a final liveness detection result of the to-be-detected image, the semantic segmentation processing can be performed on the to-be-detected image. Specifically, a pixel classification can be performed on the spoofing medium area and remaining areas except for the spoofing medium area in the to-be-detected image, to obtain the first masked image corresponding to the medium image block of the spoofing medium.

In the process of specific semantic segmentation processing, in order to improve accuracy and efficiency of the semantic segmentation, a semantic segmentation model is introduced for the semantic segmentation processing. In an optional implementation provided by the present embodiment, in the process of performing the semantic segmentation processing on the to-be-detected image to obtain the first masked image corresponding to the medium image block in the to-be-detected image, the following operations are performed.

The to-be-detected image is inputted into the semantic segmentation model for performing the semantic segmentation processing on the to-be-detected image to obtain the first masked image. The semantic segmentation model includes an encoder and a decoder.

The encoder is configured to perform feature extraction on the spoofing medium in the to-be-detected image, to obtain a medium feature corresponding to the spoofing medium; the decoder is configured to perform the semantic segmentation on the to-be-detected image based on the medium feature, to obtain the first masked image.

It should be noted that the semantic segmentation model used in the present embodiment can be a UNet model and variants of the UNet model, as well as a Deeplab model and variants of the Deeplab model. The specific model types are not limited here and are determined according to a practical application scenario.

Specifically, the feature extraction includes N times of down-sampling processing, $N \geq 1, 2, 3, \ldots, N$ is a positive integer. The semantic segmentation includes: N times of up-sampling processing, and discretization processing on a result of the up-sampling processing to obtain a grayscale image, and binarization processing on the grayscale image to obtain the first masked image.

As shown in FIG. 3, the to-be-detected image A is inputted into the semantic segmentation model, the feature extraction is performed on the electronic screen in the to-be-detected image by the encoder to obtain a screen feature corresponding to the electronic screen; the semantic segmentation is performed on the to-be-detected image based on the screen feature by the decoder to obtain the first masked image. A light colored area in the first masked image is the medium image block.

In addition, the semantic segmentation model can also include an encoder, a decoder and an image processing module. The encoder performs layer-wise feature extraction and down-sampling on the spoofing medium in the to-be-detected image to obtain semantic features of respective layers. The decoder fuses the semantic features of the respective layers and performs up-sampling, to obtain an up-sampled image having a same size as the to-be-detected image. The image processing module performs discretization processing on the up-sampled image to obtain a grayscale image. The binarization processing is performed on the grayscale image to obtain the first masked image.

In a practical application, the semantic segmentation model can also be trained before being specifically applied. A specific application process of the semantic segmentation model has been explained above, and a model training process of the semantic segmentation model will be explained in detail below.

(1) An Image Sample Dataset for Training the Model is Constructed.

The spoofing medium image is acquired; a spoofing medium image unconformable to a requirement is removed from the spoofing medium image; a medium image block and a target image block is labelled for the spoofing medium image after the removal, to generate the image sample dataset.

It should be noted that since the semantic segmentation model learning is targeted at the spoofing medium and grasping a feature of the spoofing medium, a spoofing medium image here may not necessarily contain a user's biometric feature, any image of a spoofing medium type can be used as a training sample, such as electronic screen images, paper photo images, etc. The electronic screen images and paper photo images may not carry the user's biometric feature.

In the present embodiment, the image sample dataset for training the model has a simpler data acquisition and lower acquisition cost compared to using a deep learning model for a liveness detection in related technologies. The deep learning model requires a large amount of data support and acquisition of a large number of spoofing images that contain the user's biometric feature. However, there are still very few attack examples in business scenarios, resulting in that spoofing images to be obtained are limited in number, and customized collection of spoofing images is needed. Meanwhile, in the process of learning sample data through a model, overfitting of the model may occur, and correct classification cannot be performed during application of the model. While the semantic segmentation model in the present embodiment learns the feature of the spoofing medium, reducing the risk of overfitting and helping to improve the accuracy of the semantic segmentation processing. Meanwhile, the semantic segmentation model belongs to pixel-level supervision and fine-grained segmentation, which also improves the accuracy of the semantic segmentation processing.

(2) An Initial Semantic Segmentation Model is Constructed.

An encoder and a decoder are constructed, where the encoder is at a convolutional layer responsible for feature extraction; the decoder is at a deconvolution layer responsible for up-sampling a result outputted by the encoder; the convolutional layer and the deconvolution layer are not specifically limited here in number, which is determined according to a practical application scenario.

(3) Image Sample Data in the Image Sample Dataset is Preprocessed to Obtain a preprocessed image sample dataset.

Data augmentation processing is performed on the image sample data of the image sample dataset to obtain a processed image sample dataset; specifically, in the process of data augmentation processing, many data augmentation processing approaches can be selected, for example, any image of an electronic screen area can be randomly cropped from an original image for multiplication.

(4) The Semantic Segmentation Model is Obtained by Training an Initial Semantic Segmentation Model with the Preprocessed Image Sample Dataset.

Step S104, perform a biometric recognition on the to-be-detected image to obtain boundary information of a biometric image block in the to-be-detected image.

The biometric image block described in the present embodiment refers to a biometric area or a biometric range in the to-be-detected image, such as a face area or a face range in the to-be-detected image A as shown in FIG. 4.

The boundary information refers to information of a biometric feature boundary in the to-be-detected image. The boundary information can be a bounding box. In addition, the boundary information can also be other boundary forms. The biometric feature includes global face information or local face information, such as eye information. In addition, the biometric feature can also be global body part information (such as remaining body part information except for a head) or local body part information (such as partial body part information in the remaining body part information except for the head).

As mentioned above, the semantic segmentation processing is performed on the to-be-detected image to obtain the first masked image corresponding to the medium image block in the to-be-detected image; in this step, the biometric recognition is performed on the to-be-detected image, so that a biometric range in the to-be-detected image is learnt and the boundary information of the biometric image block is obtained.

In a specific implementation, in order to improve the accuracy and the efficiency of the biometric recognition, a biometric recognition module can be used for the biometric recognition, the efficiency of the biometric recognition can be improved by a modular detection mode. In an optional implementation provided by the present embodiment, in the process of performing the biometric recognition on the to-be-detected image to obtain the boundary information of the biometric image block in the to-be-detected image, the following operations are performed.

The to-be-detected image is inputted into the biometric recognition module for performing the biometric recognition to obtain the biometric image block; the boundary information is constructed according to position information of boundary pixels of the biometric image block in the to-be-detected image.

The biometric recognition module can be implemented by algorithms or other forms of architectures for the biometric recognition, for example, using MTCNN (Multi-task Cascaded Convolutional Networks) for a face detection.

As shown in FIG. 4, the to-be-detected image A is inputted into the biometric recognition module for performing the biometric recognition to obtain the biometric image block. The boundary information, i.e. a dashed box in the figure, is constructed according to the position information of the boundary pixels of the biometric image block in the to-be-detected image A.

In addition, after performing the biometric recognition on the to-be-detected image to obtain the boundary information of the biometric image block in the to-be-detected image, the following operations can also be performed.

Whether the biometric image block conforms to a preset feature rule is judged based on the boundary information.

If so, steps S106 to S110 are performed.

If not, the to-be-detected image is determined as a live image.

The preset feature rule includes being greater than a reflectance threshold, there being an artifact, there being a Moiré pattern, and/or there being a specular reflection.

Specifically, whether the biometric image block conforms to the preset feature rule is judged based on the boundary information. If so, it indicates that the to-be-detected image may be a spoofing image, in order to further improve the accuracy of the liveness detection and avoid false detection, steps S106 to S110 are further performed to determine the final liveness detection result of the to-be-detected image; if not, it indicates that the to-be-detected image may be a live image, in order to improve the efficiency of the liveness detection of the to-be-detected image, the to-be-detected image is determined as the live image.

For example, whether the biometric image block presents a specular reflection is judged based on the boundary information; if so, it indicates that the to-be-detected image may be a photo type spoofing image, and steps S106 to S110 are further performed to determine the final liveness detection result of the to-be-detected image; if not, it indicates that the to-be-detected image may be a live image, and the to-be-detected image is determined as the live image.

In addition, after performing the biometric recognition on the to-be-detected image to obtain the boundary information of the biometric image block in the to-be-detected image, the following operations can also be performed.

If multiple biometric image blocks are detected, an image block area of each biometric image block in the multiple biometric image blocks is calculated according to the boundary information; a biometric image block having a largest area is determined, and the biometric image blocks except for the biometric image block having the largest area are removed from the multiple biometric image blocks.

In a practical application, if liveness features are present in the multiple biometric image blocks, an area presented by a liveness feature is relatively large, therefore, in a case where multiple biometric image blocks are detected, the biometric image block having the largest image block area is selected for subsequent calculation of the degree of overlap and determination of the liveness detection result, to improve the efficiency of the liveness detection of the to-be-detected image. Step S106, process pixels of the to-be-detected image based on the boundary information to obtain a second masked image corresponding to the biometric image block.

The second masked image described in the present embodiment includes the biometric image block and a target image block. The to-be-detected image includes the target image block and the biometric image block. Pixels in the biometric image block are inconsistent with pixels in the target image block in terms of their pixel values. The second masked image shown in FIG. 4 is a binary masked image; the pixels in the biometric image block have a pixel value of 255, i.e. a light colored area; the pixels in the target image block is set to have a pixel value of 0, i.e. a dark colored area. Explanation of specific colors of the biometric image block and the target image block here is as described in the first masked image above, and will not be repeated.

As mentioned above, the biometric recognition is performed on the to-be-detected image to obtain the boundary information of the biometric image block in the to-be-detected image; in the present step, the pixels of the to-be-detected image are processed with the help of the boundary information to obtain the second masked image. In a specific process of processing the pixels of the to-be-detected image, on the above basis of performing the biometric recognition by the biometric recognition module and constructing the boundary information, the second masked image can be obtained by binarizing the pixels in the biometric image block of the to-be-detected image and the pixels in target feature image block of the to-be-detected image in terms of their pixel values. Contrast intensity between the biometric image block and the target image block is improved by binarizing, to facilitate a subsequent degree-of-overlap calculation.

In an optional implementation provided by the present embodiment, in the process of processing the pixels of the to-be-detected image based on the boundary information to obtain the second masked image corresponding to the biometric image block, the following operations are performed.

The target image block is determined in the to-be-detected image based on the boundary information; the to-be-detected image includes the target image block and the biometric image block; the pixels in the biometric image block and the pixels in the target image block are binarized in terms of their pixel values to obtain the second masked image, where the pixels in the biometric image block that are binarized in terms of their pixel values are determined to be of a first pixel value, and the pixels in the target image block that are binarized in terms of their pixel values are determined to be of a second pixel value.

The binarization here refers to that the pixels in the two image blocks are adjusted in terms of pixel values to be of two different pixel values.

Specifically, before binarizing, each pixel in the to-be-detected image may have a different pixel value. Therefore, the biometric image block and the target image block can be distinguished in the to-be-detected image based on the boundary information. The second masked image is obtained by binarizing the pixels in the biometric image block in terms of their pixel values and the pixels in the target image block in terms of their pixel values. The pixels in the biometric image block that are binarized in terms of their pixel values are determined to be of the first pixel value, and the pixels in the target image block that are binarized in terms of their pixel values are determined to be of the second pixel value.

As shown in FIG. 4, the first pixel value is 255, the second pixel value is 0, the biometric image block that is subject to binarization is a light colored area in the figure, the target image block that is subject to binarization is a dark colored area in the figure. The first pixel value and the second pixel value here can also be other values, with the premise that the first pixel value is not equal to the second pixel value, values of the first pixel value and the second pixel value are not subject to specific limitations.

Step S108, obtain, through calculation, a degree of overlap between the medium image block and the biometric image block based on the first masked image and the second masked image.

As mentioned above, the pixel filling is performed on the to-be-detected image based on the boundary information to obtain the second masked image corresponding to the biometric image block; in the present step, the degree of overlap between the medium image block and the biometric image block is calculated based on the first masked image and the second masked image, to judge the liveness detection result of the to-be-detected image according to the calculated degree of overlap.

In order to achieve flexibility in the degree of overlap calculation and meet various computing scenarios, the following provides two calculation approaches for the degree of overlap between the medium image block and the biometric image block, including an area calculation approach and a pixel number calculation approach. The specific implementation process of the two calculation approaches is explained in detail.

(1) Area Calculation Approach

In an optional implementation provided by the present embodiment, the degree of overlap between the medium image block and the biometric image block is calculated hereunder specifically by means of:

determining an intersection image block and a union image block between the medium image block and the biometric image block; calculating a first image block area of the intersection image block, and calculating a second image block area of the union image block; calculating a ratio of the first image block area to the second image block area as the degree of overlap.

The intersection image block refers to an image block of intersection of the medium image block and the biometric image block; the union image block refers to an image block of union of the medium image block and the biometric image block; the first image block area is an area of the intersection image block; the second image block area is an area of the union image block.

For example, the first image block area of the intersection image block is calculated to be 36 $cm^2$, and the second image block area of the union image block is calculated to be 48 $cm^2$. Therefore, the ratio of the first image block area to the second image block area is 36/48=75%, which serves as the degree of overlap between the medium image block and the biometric image block.

(2) Pixel Number Calculation Approach

In another optional implementation provided by the present embodiment, specifically, the degree of overlap between the medium image block and the biometric image block is calculated hereunder by means of:

determining the intersection image block and the union image block between the medium image block and the biometric image block; calculating the number of intersection pixels in the intersection image block, and calculating the number of union pixels in the union image block; and calculating a ratio of the intersection number to the union number as the degree of overlap.

Furthermore, in addition to the implementation of calculating the degree of overlap between the medium image block and the biometric image block by using one of the above two kinds of calculation approaches, that is, the area calculation approach or the pixel number calculation approach, if the degree of overlap between the medium image block and the biometric image block calculated by the area calculation approach is inconsistent with that calculated by the pixel number calculation approach, the degree of overlap between the medium image block and the biometric image block can also be calculated by combining the area calculation approach and the pixel number calculation approach. For example, an average of the degree of overlap calculated by the area calculation approach and the degree of overlap calculated by the pixel number calculation approach is taken as a final degree of overlap between the medium image block and the biometric image block; for another example, a maximum of the degree of overlap calculated by the area calculation approach and the degree of overlap calculated by the pixel number calculation approach is taken as the final degree of overlap between the medium image block and the biometric image block.

Step S110, determine a liveness detection result of the to-be-detected image according to the degree of overlap.

As mentioned above, the degree of overlap between the medium image block and the biometric image block is obtained and calculated based on the first masked image and the second masked image; in the present step, the liveness detection result of the to-be-detected image is determined based on the calculated degree of overlap. Specifically, whether the to-be-detected image is a live image or a spoofing image is judged.

In a practical application, in order to determine the liveness detection result of the to-be-detected image according to the degree of overlap between the medium image block and the biometric image block, a preset degree-of-overlap threshold can be set to distinguish between the live image and the spoofing image. Specifically, in an optional implementation provided by the present embodiment, in the process of determining the liveness detection result of the to-be-detected image according to the degree of overlap, the following operations are performed.

If the degree of overlap is greater than or equal to a preset degree-of-overlap threshold, the to-be-detected image is determined as a spoofing image; if the degree of overlap is less than the preset degree-of-overlap threshold, the to-be-detected image is determined as a live image.

The spoofing image refers to a user's counterfeit biometric image, such as a paper photo containing a face feature; the live image refers to a real user's biometric image, such as a real user's face feature image captured directly by a camera.

For example, the preset degree-of-overlap threshold is 35%, the calculated degree of overlap is 90%, the calculated degree of overlap is greater than the preset degree-of-overlap threshold, it indicates that the likelihood of a biometric feature being in the spoofing medium is high, therefore, the to-be-detected image is determined to be a spoofing image. For another example, the preset degree-of-overlap threshold is 35%, the calculated degree of overlap is 10%, the calculated degree of overlap is less than the preset degree-of-overlap threshold, it indicates that the likelihood of a biometric feature being in the spoofing medium is low, therefore, the to-be-detected image is determined to be a live image.

Besides, in practice, there may also be a situation where a liveness feature is located in the medium image block. The liveness feature refers to the relevant feature of a living organism, such as a live face. For example, in the process of collecting the to-be-detected image, the live face is in front of a mobile phone screen, and another mobile phone camera is used to shoot from the front of the face. In this case, a displayed to-be-detected image is an image of the live face in the mobile phone screen. In view of this, to avoid bias in an image liveness detection in this situation, the following operations can be performed.

If the degree of overlap is greater than or equal to a preset degree-of-overlap threshold, a medium image block area of the medium image block is calculated and a biometric image block area of the biometric image block is calculated.

If the biometric image block area is greater than or equal to the medium image block area, the to-be-detected image is determined as a live image.

If the biometric image block area is less than the medium image block area, the to-be-detected image is determined as a spoofing image.

An example is taken below where an image liveness detection method provided by the present embodiment is applied in a face detection scenario, and the image liveness detection method applied in the face detection scenario provided by the present embodiment is further explained in conjunction with FIG. 2 and FIG. 5. With reference to FIG. 5, the image liveness detection method applied in the face detection scenario specifically includes the following steps.

Step S502, input a to-be-detected image into a semantic segmentation model for performing semantic segmentation processing on the to-be-detected image to obtain a first masked image corresponding to a medium image block in the to-be-detected image.

The spoofing medium includes, but is not limited to: electronic screens, paper photos, masks, head models.

In the schematic diagram of an image liveness detection process shown in FIG. 2, the spoofing medium is an electronic screen, and the semantic segmentation processing is performed on the to-be-detected image to obtain the first masked image corresponding to the medium image block of the spoofing medium (i.e. the electronic screen). The light colored area in the first masked image is the medium image block (i.e. the electronic screen image block).

Step S504, input the to-be-detected image into a face detection module for performing a face information detection to obtain a face information image block, and construct boundary information according to position information of a boundary pixel of the face information image block in the to-be-detected image.

As shown in FIG. 2, the face information image block is obtained by performing the face information detection on the to-be-detected image, and the boundary information of the face information image block is constructed according to the position information of a pixel at a boundary of the face information image block.

Step S506, determine a target image block in the to-be-detected image based on the boundary information.

The to-be-detected image includes the target image block and the face information image block.

Step S508, binarize pixels in the face information image block in terms of their pixel values and pixels in the target image block in terms of their pixel values to obtain a second masked image.

The pixels in the face information image block that are binarized in in terms of their pixel values are determined to be of a first pixel value, and the pixels in the target image block that are binarized in terms of their pixel values are determined to be of a second pixel value.

As shown in FIG. 2, based on the constructed boundary information, the target image block in the to-be-detected image is determined. The face information image block here is the light colored area in the second masked image, and the target image block is the dark colored area. The pixels in the face information image block and the pixels in the target image block are binarized in terms of their pixel values to obtain the second masked image.

Step S510, determine an intersection image block and a union image block between the medium image block and the face information image block.

Step S512, calculate a first image block area of the intersection image block, and calculate a second image block area of the union image block.

Step S514, calculate a ratio of the first image block area to the second image block area as a degree of overlap between the medium image block and the face information image block.

As shown in FIG. 2, the degree of overlap between the face information image block and the medium image block is calculated. That is, the intersection image block and the union image block between the medium image block and the face information image block are determined; the first image block area of the intersection image block is calculated, the second image block area of the union image block is calculated, and the ratio of the first image block area to the second image block area is calculated as the degree of overlap between the medium image block and the face information image block.

In addition, steps S510 to S514 can also be replaced by: determine the intersection image block and the union image block between the medium image block and the face information image block; calculate a number of intersection pixels in the intersection image block, and calculate a number of union pixels in the union image block; calculate a ratio of the number of intersection pixels to the number of union pixels as the degree of overlap between the medium image block and the face information image block.

Step S516, if the degree of overlap is greater than or equal to a preset degree-of-overlap threshold, determine the to-be-detected image as a spoofing image.

Step S518, if the degree of overlap is less than the preset degree-of-overlap threshold, determine the to-be-detected image as a live image.

An embodiment of an image liveness detection device provided in the present disclosure is as follows.

In the above embodiments, the image liveness detection method is provided, and correspondingly, an image liveness detection device is also provided, which will be described below with reference to the accompanying drawings.

With reference to FIG. 6, a schematic diagram of the image liveness detection device provided in the present embodiment is shown.

Since device embodiments correspond to the method embodiments, the description is relatively simple. Please refer to the corresponding explanation of the method embodiments provided above for the relevant parts. The device embodiments described below are only exemplary.

The embodiment provides the image liveness detection device, including: a semantic segmentation processing module 602, a biometric recognition module 604, a pixel processing module 606, a degree-of-overlap calculation module 608 and a detection result determination module 610.

The semantic segmentation processing module 602 is configured to perform semantic segmentation processing on a to-be-detected image to obtain a first masked image corresponding to a medium image block in the to-be-detected image.

The biometric recognition module 604 is configured to perform a biometric recognition on the to-be-detected image to obtain boundary information of a biometric image block in the to-be-detected image.

The pixel processing module 606 is configured to perform pixel processing on the to-be-detected image based on the boundary information to obtain a second masked image corresponding to the biometric image block.

The degree-of-overlap calculation module 608 is configured to perform a degree of overlap calculation on the medium image block and the biometric image block based on the first masked image and the second masked image to obtain a degree of overlap.

The detection result determination module 610 is configured to determine a liveness detection result of the to-be-detected image according to the degree of overlap.

An embodiment of an image liveness detection apparatus provided in the present disclosure is as follows.

An embodiment of the present disclosure further provides an image liveness detection apparatus corresponding to the above described image liveness detection method, based on a same technical concept. This image liveness detection apparatus is configured to implement the above provided image liveness detection method. FIG. 7 is a schematic structural diagram of an image liveness detection apparatus provided in an embodiment of the present disclosure.

An image liveness detection apparatus provided in the embodiment includes the following.

As shown in FIG. 7, the image liveness detection apparatus may have relatively large differences due to different configurations or performances, and may include one or more processors 701 and memories 702, and the memory 702 may store one or more storage application programs or data. The memory 702 may be a short-term storage or a persistent storage. The application program stored in the memory 702 may include one or more modules (not shown), and each module may include a series of computer-executable instructions in the image liveness detection apparatus. Furthermore, the processor 701 may be configured to communicate with the memory 702, and execute a series of computer-executable instructions in the memory 702 on the image liveness detection apparatus. The image liveness detection apparatus may also include one or more power sources 703, one or more wired or wireless network interfaces 704, one or more input/output interfaces 705, one or more keyboards 706, and the like.

In a specific embodiment, the image liveness detection apparatus includes a memory and one or more programs, where the one or more programs are stored in the memory and may include one or more modules, and each module may include a series of computer-executable instructions in the image liveness detection apparatus, and it is configured such that one or more processors execute the one or more programs including computer-executable instructions for performing the following operations.

The semantic segmentation processing is performed on the to-be-detected image to obtain the first masked image corresponding to the medium image block in the to-be-detected image; the biometric recognition is performed on the to-be-detected image to obtain the boundary information of the biometric image block in the to-be-detected image; the pixel processing is performed on the to-be-detected image based on the boundary information to obtain the second masked image corresponding to the biometric image block; the degree of overlap calculation is performed on the medium image block and the biometric image block based on the first masked image and the second masked image to obtain a degree of overlap; the liveness detection result of the to-be-detected image is determined according to the degree of overlap.

An embodiment of a computer-readable storage medium provided in the present disclosure is as follows.

Corresponding to the image liveness detection method described above, based on the same technical concept, an embodiment of the present disclosure further provides a computer-readable storage medium.

The computer-readable storage medium provided in the present embodiment is used for storing computer-executable instructions, and when the computer-executable instructions are executed by a processor, the following processes is implemented.

The semantic segmentation processing is performed on the to-be-detected image to obtain the first masked image corresponding to the medium image block in the to-be-detected image; the biometric recognition is performed on the to-be-detected image to obtain the boundary information of the biometric image block in the to-be-detected image; the pixel processing is performed on the to-be-detected image based on the boundary information to obtain the second masked image corresponding to the biometric image block; the degree of overlap calculation is performed on the medium image block and the biometric image block based on the first masked image and the second masked image to obtain a degree of overlap; the liveness detection result of the to-be-detected image is determined according to the degree of overlap.

It should be noted that the embodiment of the computer-readable storage medium in the present disclosure and the embodiments of the image liveness detection method in the present disclosure are based on the same inventive concept, so a reference for the specific implementation of this embodiment can be made to the implementation of the corresponding method above, and repeated details will not be described again.

The foregoing describes specific embodiments of the present disclosure. Other embodiments are within the scope of the appended claims. In some cases, the actions or steps recited in the claims can be performed in a different order than in the embodiments with desired results still achieved. Additionally, the processes depicted in the figures do not necessarily require the specific order shown, or sequential order, to achieve desirable results. Multitasking and parallel processing are also possible or may be advantageous in certain implementations.

As will be appreciated by those skilled in the art, the embodiments of the present disclosure may be provided as a method, a system, or a computer program product. Accordingly, the embodiments of the present disclosure may take the form of an entirely hardware embodiment, an entirely software embodiment, or an embodiment combining software and hardware aspects. Furthermore, the present disclosure may take the form of a computer program product embodied on one or more computer-readable storage media (including, but not limited to, disk storage, CD-ROM, optical storage, etc.) having computer-available program codes embodied therein.

The present disclosure is described with reference to flowcharts and/or block diagrams of methods, apparatuses (systems), and computer program products according to embodiments of the present disclosure. It will be understood that each flow and/or block in the flowcharts and/or block diagrams, and combinations of flows and/or blocks in the flowcharts and/or block diagrams, can be implemented by computer program instructions. These computer program instructions may be provided to the processor of a general purpose computer, a special purpose computer, an embedded processor or other programmable image liveness detection apparatuses to produce a machine such that the instructions executed by the processor of the computer or other programmable image liveness detection apparatuses produce means for implementing the functions specified in a flow or flows of a flowchart and/or a block or blocks of a block diagram.

These computer program instructions may also be stored in a computer-readable memory capable of directing a computer or other programmable image liveness detection apparatuses to function in a particular manner, such that the instructions stored in the computer-readable memory result in an article of manufacture including instruction means. The instruction means implements the functions specified in the flow or flows of the flowcharts and/or the block or blocks of the block diagrams.

These computer program instructions can also be loaded on a computer or other programmable image liveness detection apparatuses to cause a series of operational steps to be performed on the computer or other programmable apparatuses to produce a computer-implemented process such that the instructions executed on a computer or other programmable apparatuses provide steps for implementing the functions specified in the flow or flows of the flowcharts and/or the block or blocks of the block diagrams.

In a typical configuration, a computing device includes one or more processors (CPUs), input/output interfaces, a network interface, and a memory.

The memory may include a non-persistent memory in a computer-readable medium, a random access memory (RAM) and/or a non-volatile memory etc., for example, a read only memory (ROM) or a flash memory (flash RAM). The memory is an example of a computer-readable medium.

The computer-readable medium includes permanent and non-permanent, removable and non-removable media, and storage of information may be implemented by any method or technology. Information may be computer-readable instructions, data structures, modules of programs, or other data. Examples of the computer storage medium include, but are not limited to, a phase-change memory (PRAM), a static random access memory (SRAM), a dynamic random access memory (DRAM), other types of random access memory (RAM), a read only memory (ROM), an Electrically Erasable Programmable Read Only Memory (EEPROM), a Flash Memory or other memory technology, a Compact Disc Read Only Memory (CD-ROM), a Digital Versatile Disc (DVD) or other optical storage, Magnetic tape cassettes, magnetic disk storage or other magnetic storage devices or any other non-transmission medium that can be used to store information that can be accessed by a computing device. As defined herein, the computer-readable medium does not include transitory computer-readable media, such as modulated data signals and carrier waves.

It should also be noted that the terms "comprise", "include" or any other variation thereof are intended to encompass a non-exclusive inclusion such that a process, method, article or device comprising a series of elements includes not only those elements, but also other elements not expressly listed, or elements which are inherent to such a process, method, article or device are also included. Without further limitation, an element qualified by the phrase "comprising a . . . " does not preclude the presence of additional identical elements in the process, method, article or device that includes the element.

Embodiments of the present disclosure may be described in the general context of computer-executable instructions, such as program modules, being executed by a computer. Generally, program modules include routines, programs, objects, components, data structures, etc. that perform particular tasks or implement particular abstract data types. One or more embodiments of the present disclosure may also be practiced in distributed computing environments where tasks are performed by remote processing devices that are linked through a communications network. In a distributed computing environment, program modules may be located in both local and remote computer storage media including storage devices.

Each embodiment in the present disclosure is described in a progressive manner. A reference can be made to each other for the same and similar parts between the various embodiments. Each embodiment focuses on its differences from other embodiments. In particular, for the system embodiment, since it is basically similar to the method embodiment, the description is relatively simple. For relevant details, please refer to the partial description of the method embodiments.

The above descriptions are merely examples of this document, and are not intended to limit this document. Various modifications and variations of this document are possible for those skilled in the art. Any modification, equivalent replacement, improvement, etc. made within the spirit and principle of this document shall be included within the scope of the claims of this document.

What is claimed is:

1. An image liveness detection method, comprising:

performing semantic segmentation processing on a to-be-detected image to obtain a first masked image corresponding to a medium image block in the to-be-detected image;

performing a biometric recognition on the to-be-detected image to obtain boundary information of a biometric image block in the to-be-detected image;

processing pixels of the to-be-detected image based on the boundary information to obtain a second masked image corresponding to the biometric image block;

obtaining, through calculation, a degree of overlap between the medium image block and the biometric image block based on the first masked image and the second masked image; and determining a liveness detection result of the to-be-detected image according to the degree of overlap, wherein the performing the semantic segmentation processing on the to-be-detected image to obtain the first masked image corresponding to the medium image block in the to-be-detected image comprises: inputting the to-be-detected image into a semantic segmentation model, wherein the semantic segmentation model comprises a first encoder and a first decoder; and wherein the first encoder performs feature extraction on a spoofing medium in the to-be-detected image to obtain a medium feature corresponding to the spoofing medium, and the first decoder performs semantic segmentation on the to-be-detected image based on the medium feature to obtain the first masked image, or wherein the performing the semantic segmentation processing on the to-be-detected image to obtain the first masked image corresponding to the medium image block in the to-be-detected image comprises:

inputting the to-be-detected image into a semantic segmentation model, wherein the semantic segmentation model comprises a second encoder, a second decoder and an image processor; and wherein the second encoder is configured to perform layer-wise feature extraction and down-sampling on a spoofing medium in the to-be-detected image to obtain semantic features of respective layers; the second decoder is configured to fuse the semantic features of the respective layers and perform up-sampling, to obtain an up-sampled image having a same size as the to-be-detected image; the image processor is configured to perform discretization processing on the up-sampled image to obtain a grayscale image, and perform binarization processing on the grayscale image to obtain the first masked image.

2. The method according to claim 1, wherein the obtaining, through the calculation, the degree of overlap between the medium image block and the biometric image block based on the first masked image and the second masked image comprises:

determining an intersection image block and a union image block between the medium image block and the biometric image block;

calculating a first image block area of the intersection image block, and calculating a second image block area of the union image block; and calculating a ratio of the first image block area to the second image block area as the degree of overlap.

3. The method according to claim 1, wherein, the obtaining, through the calculation, the degree of overlap between the medium image block and the biometric image block based on the first masked image and the second masked image comprises:

determining an intersection image block and a union image block between the medium image block and the biometric image block;

calculating a number of intersection pixels in the intersection image block, and calculating a number of union pixels in the union image block; and calculating a ratio of the number of intersection pixels to the number of union pixels as the degree of overlap.

4. The method according to claim 1, wherein the determining the liveness detection result of the to-be-detected image according to the degree of overlap comprises:

in response that the degree of overlap is greater than or equal to a preset degree-of-overlap threshold, determining the to-be-detected image as a spoofing image; and in response that the degree of overlap is less than the preset degree-of-overlap threshold, determining the to-be-detected image as a live image.

5. The method according to claim 1, wherein the determining the liveness detection result of the to-be-detected image according to the degree of overlap comprises:

in response that the degree of overlap is greater than or equal to a preset degree-of-overlap threshold, calculating an area of the medium image block and an area of the biometric image block;

in response that the area of the biometric image block is greater than or equal to the area of the medium image block, determining the to-be-detected image as a live image; and in response that the area of the biometric image block is less than the area of the medium image block, determining the to-be-detected image as a spoofing image.

6. The method according to claim 1, wherein the performing the biometric recognition on the to-be-detected image to obtain the boundary information of the biometric image block in the to-be-detected image comprises:

inputting the to-be-detected image into a biometric recognition module for performing the biometric recognition to obtain the biometric image block; and constructing the boundary information according to position information of a boundary pixel of the biometric image block in the to-be-detected image.

7. The method according to claim 6, wherein the processing the pixels of the to-be-detected image based on the boundary information to obtain the second masked image corresponding to the biometric image block comprises:

determining a target image block in the to-be-detected image based on the boundary information, wherein the to-be-detected image comprises the target image block and the biometric image block;

binarizing pixels in the biometric image block in terms of their pixel values and pixels in the target image block in terms of their pixel values to obtain the second masked image; and wherein the pixels in the biometric image block that are binarized in terms of their pixel values are determined to be of a first pixel value, and the pixels in the target image block that are binarized in terms of their pixel values are determined to be of a second pixel value.

8. The method according to claim 1, wherein the feature extraction comprises: N times of down-sampling processing, $N \geq 1, 2, 3 \ldots$, and N is a positive integer; and the semantic segmentation comprises: N times of up-sampling processing, and discretization processing on a result of the up-sampling processing to obtain a gray-scale image, and binarization processing on the gray-scale image.

9. The method according to claim 1, wherein the semantic segmentation model is trained in a mode comprising:

constructing an image sample dataset according to a spoofing medium image;

preprocessing an image sample data in the image sample dataset; wherein the preprocessing comprises data augmentation processing; and performing model training on an initial semantic segmentation model based on the preprocessed image sample dataset to obtain the semantic segmentation model.

10. The method according to claim 9, wherein the constructing the image sample dataset according to the spoofing medium image comprises:

acquiring the spoofing medium image;

removing, from the spoofing medium image, a spoofing medium image unconformable to a preset requirement; and labelling a medium image block and a target image block for the spoofing medium image after the removal, to generate the image sample dataset.

11. The method according to claim 1, wherein the processing the pixels of the to-be-detected image based on the boundary information to obtain the second masked image corresponding to the biometric image block comprises:

judging, based on the boundary information, whether the biometric image block conforms to a preset feature rule;

in a case that the biometric image block conforms to the preset feature rule, processing the pixels of the to-be-detected image based on the boundary information to obtain the second masked image corresponding to the biometric image block;

wherein the preset feature rule comprises at least one of: being greater than a reflectance threshold, there being an artifact, there being a Moiré pattern, and there being a specular reflection.

12. The method according to claim 1, wherein after performing the biometric recognition on the to-be-detected image to obtain the boundary information of the biometric image block in the to-be-detected image, the method further comprises:

in a case that boundary information of a plurality of biometric image blocks is detected, calculating an area of each of the biometric image blocks according to the boundary information; and determining a biometric image block having a largest area, and removing all biometric image blocks except for the biometric image block having the largest area.

13. The method according to claim 1, wherein the medium image block refers to a spoofing medium area or a spoofing medium range of a spoofing medium in the to-be-detected image.

14. The method according to claim 13, wherein the spoofing medium refers to a medium of a biometric facsimile spoofing a real person's identity.

15. An image liveness detection device, comprising:

a processor, and a memory, configured to store computer executable instructions, wherein when the computer executable instructions are executed, the processor is caused to:

perform semantic segmentation processing on a to-be-detected image to obtain a first masked image corresponding to a medium image block in the to-be-detected image;

perform a biometric recognition on the to-be-detected image to obtain boundary information of a biometric image block in the to-be-detected image;

process pixels of the to-be-detected image based on the boundary information to obtain a second masked image corresponding to the biometric image block;

obtain, through calculation, a degree of overlap between the medium image block and the biometric image block based on the first masked image and the second masked image; and determine a liveness detection result of the to-be-detected image according to the degree of overlap, wherein the processor is configured to execute the computer executable instructions to perform the semantic segmentation processing on the to-be-detected image to obtain the first masked image corresponding to the medium image block in the to-be-detected image by inputting the to-be-detected image into a semantic segmentation model, wherein the semantic segmentation model comprises a first encoder and a first decoder; and wherein the first encoder performs feature extraction on a spoofing medium in the to-be-detected image to obtain a medium feature corresponding to the spoofing medium, and the first decoder performs semantic segmentation on the to-be-detected image based on the medium feature to obtain the first masked image, or wherein the processor is configured to execute the computer executable instructions to perform the semantic segmentation processing on the to-be-detected image to obtain the first masked image corresponding to the medium image block in the to-be-detected image by:

inputting the to-be-detected image into a semantic segmentation model, wherein the semantic segmentation model comprises a second encoder, a second decoder and an image processor; and wherein the second encoder is configured to perform layer-wise feature extraction and down-sampling on a spoofing medium in the to-be-detected image to obtain semantic features of respective layers; the second decoder is configured to fuse the semantic features of the respective layers and perform up-sampling, to obtain an up-sampled image having a same size as the to-be-detected image; the image processor is configured to perform discretization processing on the up-sampled image to obtain a grayscale image, and perform binarization processing on the grayscale image to obtain the first masked image.

16. A non-transitory computer-readable storage medium configured to store computer-executable instructions, wherein when the computer-executable instructions are executed by a processor, the following is implemented:

performing semantic segmentation processing on a to-be-detected image to obtain a first masked image corresponding to a medium image block in the to-be-detected image;

performing a biometric recognition on the to-be-detected image to obtain boundary information of a biometric image block in the to-be-detected image;

processing pixels of the to-be-detected image based on the boundary information to obtain a second masked image corresponding to the biometric image block;

obtaining, through calculation, a degree of overlap between the medium image block and the biometric image block based on the first masked image and the second masked image; and determining a liveness detection result of the to-be-detected image according to the degree of overlap, wherein the performing the semantic segmentation pro-
cessing on the to-be-detected image to obtain the first
masked image corresponding to the medium image
block in the to-be-detected image comprises: inputting
the to-be-detected image into a semantic segmentation
model, wherein the semantic segmentation model com-
prises a first encoder and a first decoder; and wherein
the first encoder performs feature extraction on a spoof-
ing medium in the to-be-detected image to obtain a
medium feature corresponding to the spoofing medium,
and the first decoder performs semantic segmentation
on the to-be-detected image based on the medium
feature to obtain the first masked image, or wherein the
performing the semantic segmentation processing on
the to-be-detected image to obtain the first masked
image corresponding to the medium image block in the
to-be-detected image comprises:

inputting the to-be-detected image into a semantic
segmentation model, wherein the semantic segmen-
tation model comprises a second encoder, a second
decoder and an image processor; and wherein the second encoder is configured to perform
layer-wise feature extraction and down-sampling on a
spoofing medium in the to-be-detected image to obtain
semantic features of respective layers; the second decoder is configured to fuse the semantic features of
the respective layers and perform up-sampling, to
obtain an up-sampled image having a same size as the
to-be-detected image; the image processor is config-
ured to perform discretization processing on the up-
sampled image to obtain a grayscale image, and per-
form binarization processing on the grayscale image to
obtain the first masked image.

17. The method according to claim 1, wherein performing
semantic segmentation processing on a to-be-detected image
to obtain a first masked image corresponding to a medium
image block in the to-be-detected image comprises:

performing semantic segmentation processing on the to-
be-detected image to perform pixel classification on a
medium image block of a spoofing medium in the
to-be-detected image and remaining areas except for
the medium image block to obtain the first masked
image containing the medium image block, wherein the medium image block refers to a spoofing
medium area or a spoofing medium range of the
spoofing medium in the to-be-detected image, and the
spoofing medium refers to a medium of a biometric
facsimile spoofing a real person's identity.

\*　\*　\*　\*　\*